United States Patent [19]

Rademaker

[11] 3,731,179

[45] May 1, 1973

[54] ADJUSTABLE HIGH VOLTAGE POWER SUPPLY WITH OUTPUT POLARITY SWITCHING

[75] Inventor: Leo C. Rademaker, Fort Wayne, Ind.

[73] Assignee: General Electric Company, Fort Wayne, Ind.

[22] Filed: Sept. 22, 1972

[21] Appl. No.: 291,220

[52] U.S. Cl. ............... 321/15, 307/127, 307/138, 321/47
[51] Int. Cl. ............................................. H02m 7/00
[58] Field of Search .................... 307/109, 110, 127, 307/138; 321/15, 18, 47

[56] References Cited

UNITED STATES PATENTS

| | | |
|---|---|---|
| 2,836,735 | 5/1958 | Kreutzer.........................307/110 X |
| 2,975,353 | 3/1961 | Rockstuhl.........................321/15 X |
| 3,273,039 | 9/1966 | Godshalk et al..................307/127 X |
| 3,377,541 | 4/1968 | Farkas...................................321/15 |
| 3,526,821 | 9/1970 | Thomas...........................321/15 X |

Primary Examiner—William M. Shoop, Jr.
Attorney—John M. Stoudt et al.

[57] ABSTRACT

There is provided a high voltage power supply utilizing a high leakage reactance transformer connected to a voltage doubler which has a capability of reversing its output voltage. The power supply is of a type which may be used at several different input frequencies. There is provided an inexpensive low voltage switch connected to the secondary winding of the transformer and to ground. The low voltage switch is used to switch from one number of turns to another number of turns on the secondary winding depending on the frequency of the input signal.

8 Claims, 3 Drawing Figures

ADJUSTABLE HIGH VOLTAGE POWER SUPPLY WITH OUTPUT POLARITY SWITCHING

BACKGROUND OF THE INVENTION

This invention relates to an improved high voltage power supply and, more particularly, to a high voltage power supply whose output may be switched from one polarity to another, and whose secondary winding may be switched from one frequency to another using an inexpensive, low voltage, uninsulated switch. The circuits incorporating the invention are particularly useful as power supplies in the photo copying art.

In the past, high voltage power supplies utilizing voltage doublers which are capable of switching the output from one polarity to the other and, furthermore, are capable of operating at different frequencies have required a highly insulated and inexpensive switch at the secondary winding in order to change from one frequency of operation to another. The insulated switch was necessary because it had to withstand the high voltage with respect to ground across an output capacitor of the doubler. In general, these power supplies switch the output voltage from positive to negative by switching one of the output terminals from one side of the output capacitor to the other. When this method of polarity switching was used the frequency selecting switch which is connected to the secondary was grounded for one polarity, but for the opposite polarity it was not grounded and had a high voltage associated with it with respect to ground. Thus, it was necessary to use a highly insulated and expensive type switch to switch the frequency. An example of a power supply of this type is shown in FIG. 1 and will be discussed in detail later.

SUMMARY OF THE INVENTION

Accordingly, it is the general object of this invention to provide an improved high voltage power supply circuit with polarity switching capabilities.

Another object is to provide a high voltage power supply capable of being switched from one frequency to another utilizing an inexpensive uninsulated switch.

In accordance with one form of the present invention there is provided a transformer with input frequency selection switches connected to the primary and secondary windings in order to adjust the number of turns in the windings to correspond to the preselected frequency. The transformer is connected to the output circuit which includes a voltage doubler circuit and a polarity selection switch. One embodiment of the voltage doubler circuit is a half wave voltage doubler which includes a doubling capacitor and a charging capacitor. A pair of oppositely poled diodes are connected between the two capacitors. The polarity selection switch means comprises four switches which are operated simultaneously in pairs, but no matter which pair of the switches is closed, the frequency selection switch is always connected to ground. This averts the problem of having the frequency selection switch connected to a high voltage with respect to ground during one output polarity of operation of the power supply. The frequency selection switch in the circuit, therefore, can be an uninsulated low voltage type and thus be quite inexpensive and trouble-free.

BRIEF DESCRIPTION OF THE DRAWINGS

The subject matter which is regarded as the invention is more particularly set forth in the appended claims. The invention itself, however, together with further objects and advantages thereof may be better understood by referring to the following description in conjunction with the accompanying drawings in which:

DESCRIPTION OF THE PRIOR ART

Figure 1:
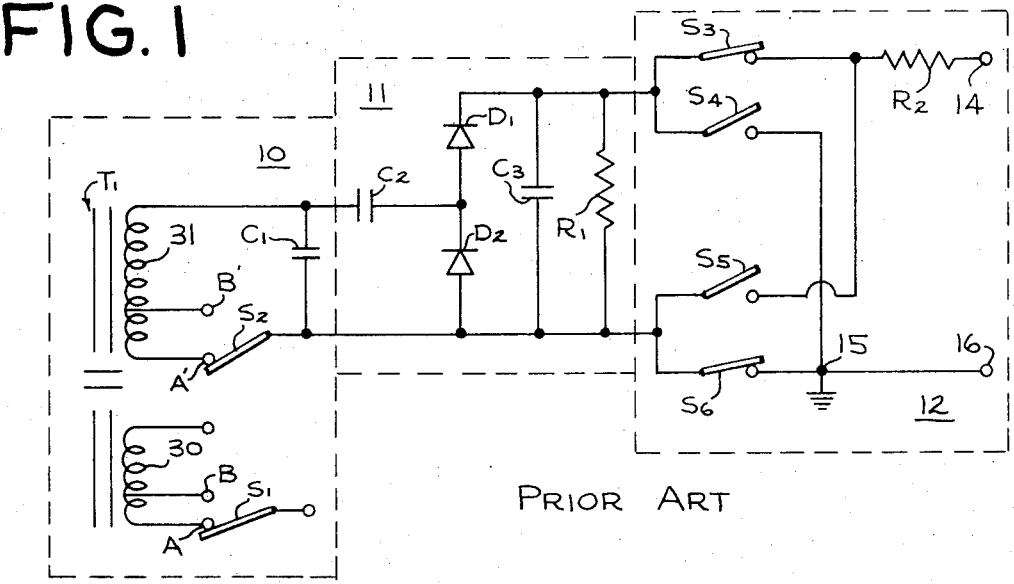
FIG. 1 is a schematic circuit diagram of a prior art power supply.

Referring now to FIG. 1, which is an example of a prior art power supply, there is provided a power supply including an input circuit 10 connected to a voltage doubler 11 and an output polarity switching circuit 12 also connected to the voltage doubler. An input voltage is provided across primary 30 of transformer $T_1$. The voltage is stepped up across secondary 31. Both the primary and secondary windings have frequency selection switches $S_1$ and $S_2$ respectively, which are used to adjust the number of turns for different preselected voltages. Capacitor $C_1$ is connected across secondary winding 31 and is used as a voltage stabilizing capacitor. The half wave voltage doubler circuit 11 is a standard half wave voltage doubler and operates to double the voltage across secondary winding 31. The doubler utilizes output capacitor $C_3$ which is charged in only one direction. The polarity at the output is determined by polarity selection switch means 12 which will switch the output from one side of capacitor $C_3$ to the other side. The polarity selection switch means 12 comprises switches $S_3$, $S_4$, $S_5$, and $S_6$, which operate together to determine the polarity of the output signal. When switches $S_3$ and $S_6$ are simultaneously closed output terminal 14 is plus and switch $S_2$ is connected to ground at point 15. Switch $S_2$ then has a low voltage on it with respect to ground. Problems occur when switches $S_4$ and $S_5$ are closed in order to reverse the polarity, and thus make negative, output terminal 14. In this condition the doubler circuit is grounded through switch $S_4$. Switch $S_2$, therefore, has a large voltage drop between itself and ground which is roughly equivalent to the charge on $C_3$. This voltage is often as high as 7,000 volts. When using this prior art circuit, switch $S_2$ must be a highly insulated expensive type switch in order to withstand the high voltages during negative polarity output.

Ground point 15 could not simply be moved to the left of switches $S_5$ and $S_6$ because this would leave output point 16, which is generally connected to the chassis of the load, ungrounded during the negative polarity position. This could be very dangerous for the operator of the machine. Thus, it is desireable to provide a power supply which is capable of operating at different selected frequencies and which an inexpensive, uninsulated frequency selection switch is connected to its secondary circuit.

DESCRIPTION OF THE PREFERRED EMBODIMENT

Figure 2:
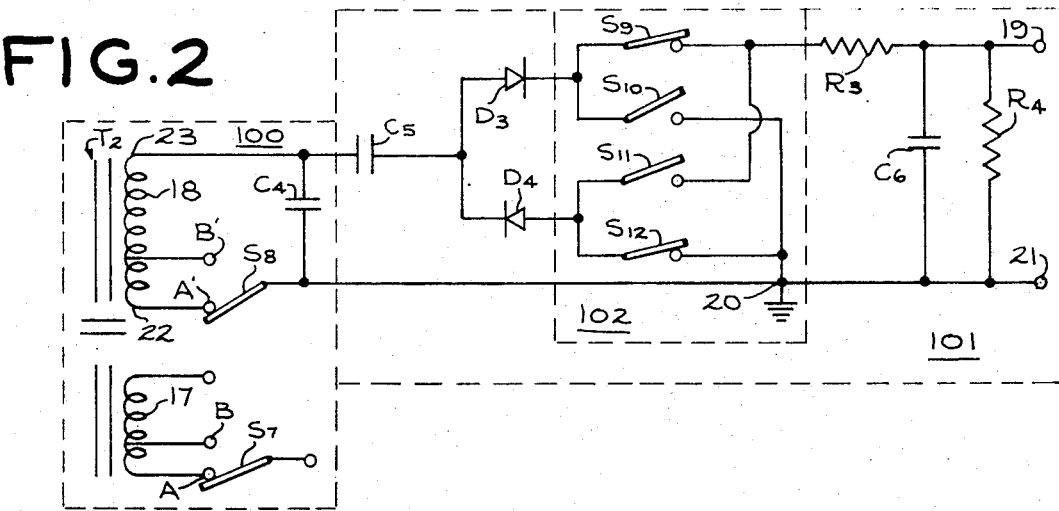
FIG. 2 is a schematic circuit diagram of one form of the improved power supply.

Referring now more particularly to FIG. 2, there is provided input circuit 100 which includes high leakage reactance transformer $T_2$ that, in the exemplification, is capable of operating at two different frequencies. Transformer $T_2$ includes primary winding 17 magnetically coupled to secondary winding 18. Primary winding 17 receives an input voltage. To this end switch $S_7$ is connected to primary winding 17 and is switched between position A and position B depending on the frequency of the input signal. For example, the frequencies selected may be 60 Hz or 50 Hz and, therefore, the number of turns in the primary and secondary windings must be adjusted. Secondary winding 18 is magnetically coupled to primary winding 17 and is used to step-up the voltage across the primary winding. In this illustration the RMS voltage across secondary winding 18 is about 3,500 volts. Switch $S_8$ is connected to secondary winding 18 and is used in conjunction with switch $S_7$ to switch from one number of turns in the windings to another number dependent upon the frequency of operation. Switch $S_8$ is always connected to ground at point 20, thus switch $S_8$ always has a low voltage with respect to ground. Thus it may be uninsulated and inexpensive. Capacitor $C_4$ is connected across secondary winding 18 and is used to stabilize the voltage across it.

The output circuit 101, which is connected to the input circuit 100, includes, in this instance, a half wave circuit in the form of a half wave voltage doubler with output polarity reversing switch means 102. Capacitor $C_5$ known as the doubling capacitor is connected to secondary winding 18. A pair of oppositely poled diodes $D_3$ and $D_4$ are connected to the other side of capacitor $C_5$. This forms part of the doubling circuit. The polarity selection switch means 102 comprises switches $S_9$, $S_{10}$, $S_{11}$, and $S_{12}$. These switches operate simultaneously to reverse output polarity. Switch $S_9$ is connected to diode $D_3$ and switch $S_{12}$ is connected to diode $D_4$. When these two switches are closed terminal 19 becomes positive with respect to terminal 21. Switch 10 is connected to diode $D_3$ and switch 11 is connected to diode $D_4$. When these two switches are closed, a negative output results. Switches $S_{10}$ and $S_{12}$ are further connected to ground at point 20. Resistor $R_3$ is connected to switches $S_9$ and $S_{11}$ and provides a current limiting function. Capacitor $C_6$ which comprises the other part of the voltage doubler circuit is connected across the polarity switching arrangement. Capacitor $C_6$, which is otherwise known as the output capacitor, charges to approximately double the voltage across secondary winding 18 on alternate half cycles. When switches $S_9$ and $S_{12}$ are closed together, capacitor $C_6$ will charge to a negative potential on its ground side. When switches $S_{10}$ and $S_{11}$ are closed together capacitor $C_6$ will charge to a positive potential on its ground side. Thus, the output polarity will reverse depending upon the position of the polarity switches. Resistor $R_4$, which is connected across capacitor $C_6$ and is used as a bleeder resistor, is of the high resistance type and will slowly discharge capacitor $C_6$ when there is no input signal across primary 17.

Operation of the circuit is as follows: there may be one of several different signal input frequencies, e.g. either 60 Hz or 50 Hz, across primary winding 17 of transformer $T_2$. For a 60 Hz input switch $S_7$ will be in the B position. For a 50 Hz input switch $S_7$ will be in the A position. Voltage across primary winding 17 is then stepped up by secondary winding 18. Switch $S_8$, which may be of the low voltage type, is connected to position B' when there is 60 Hz input and position A' when there is 50 Hz input. In order to have a positive polarity output, switches $S_9$ and $S_{12}$ are closed simultaneously. When secondary winding 18 goes positive at point 22 doubling capacitor $C_5$ is charged plus through switch 8 and through switch 12 to diode $D_4$. When the point 23 of secondary winding 18 goes positive there is effectively double the voltage which is presented across secondary 18 placed across capacitor $C_6$. Capacitor $C_6$ charges to approximately double the voltage across the secondary winding 18. Output terminal 19 is then plus. Frequency selection switch $S_8$ is grounded at point 20. Even though there is a highly negative charge on the ground side of capacitor $C_6$, there is only a small voltage to ground at switch $S_8$.

In order to obtain a negative polarity at the output 19, switches $S_9$ and $S_{12}$ are opened and switches $S_{10}$ and $S_{11}$ are closed. When the frequency selection switch side of secondary winding 18 goes negative capacitor $C_5$ is charged negative through switch $S_8$, through switch $S_{10}$ and through diode $D_3$. When the other side of secondary winding 18 goes negative the voltages at that point and across capacitor $C_5$ are placed across capacitor $C_6$ through switch 11. Output terminal 19 is then reversed to negative. Switch 8 still remains a low voltage with respect to ground at point 20 even through the polarity of the output has reversed. Because of this, switch 8 may be an inexpensive low voltage type switch. When the input signal across primary winding 17 is no longer present capacitor $C_6$ is slowly discharged through the large resistor $R_4$.

A circuit as set forth in FIG. 2 has been built and operated with components having the following values:

| Transformer | $T_{12}$ | primary winding 1,300 turns of .0113" wire secondary winding 29,500 turns of .0028" wire |
|---|---|---|
| Capacitor | $C_4$ | .009 MFD, 4 KV |
| Capacitor | $C_5$ | .1 MFD, 5 KV |
| Diode | $D_3$ | 7000 V (P1V) |
| Diode | $D_4$ | 7000 V (P1V) |
| Resistor | $R_3$ | 10 Kilohms |
| Resistor | $R_4$ | 100 Megaohms |
| Capacitor | $C_6$ | .0015 MFD, 7 KV |

Figure 3:
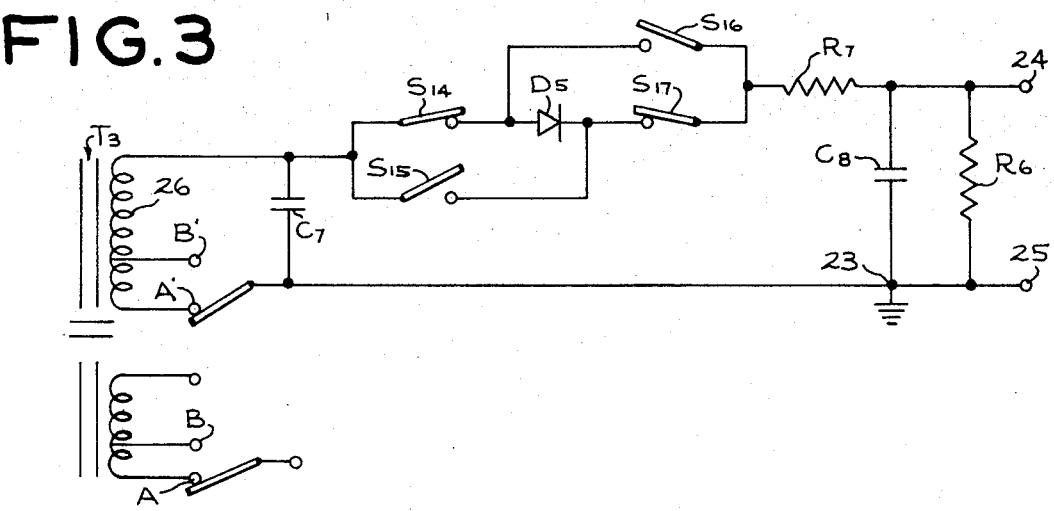
FIG. 3 is a schematic circuit diagram of another form of the output circuit of the improved power supply.

Referring now to FIG. 3, there is provided half wave circuit to provide output voltage without a voltage doubler as shown in FIG. 2. This circuit will provide an output which approximately equals the voltage across its secondary winding. Transformer $T_3$ includes step up secondary 26 which has low voltage frequency selection switch $S_{13}$ connected thereto. Again the frequency selection switch is always grounded. In this embodiment the polarity reversing switch means 103 comprises switches $S_{14}$, $S_{15}$, $S_{16}$, and $S_{17}$. The output capacitor is $C_8$. When switches $S_{14}$ and $S_{17}$ are closed capacitor $C_8$ will charge positive on the plate which is connected to output 24. When switches $S_{15}$ and $S_{16}$ are closed and switches $S_{14}$ and $S_{17}$ are open capacitor $C_8$ will charge negative on the plate which is connected to output 24. The charge on capacitor $C_8$ will approximately be equal to the voltage across secondary winding 22. In this circuit as in the circuit of FIG. 2 the frequency selection switch $S_{13}$ is connected to ground independent of the position of the polarity switch means 103 and output capacitor $C_8$ charges in either direction depending on the position of the polarity switch means 103.

From the foregoing description of the illustrative embodiment of the invention it will be apparent that many modifications may be made therein. It will be understood, therefore, that this embodiment of the invention is intended as an exemplification of the invention only and that the invention is not limited thereto. For example, the frequency selection switch may also be a voltage selection switch or may be used to select some other parameter. It is to be understood, therefore, that it is intended that the impending claims are to cover all such modifications and shall fall within the true spirit and scope of the invention.

What I claim as new and desire to secure Letters Patent of the United States is:

1. A power supply comprising:
    a transformer having primary and secondary windings; first and second output terminals, said second output terminal adapted to be connected to ground at all times during operation of said power supply;
    a selection switch connected to said secondary winding and to said second output terminal at all times during operation of said power supply;
    polarity reversing switch means connected to said transformer secondary winding and said output terminals operable for selectively reversing the polarity of said output terminals.

2. A power supply as set forth in claim 1 further including: voltage doubler means electrically connected between said transformer secondary winding and said output terminals.

3. A power supply as set forth in claim 2 wherein: said voltage doubler means is of the half wave type and includes a doubling capacitor connected to said secondary winding; a pair of oppositely poled diodes connected to said doubling capacitor; and an output capacitor connected to said output terminals.

4. A power supply as set forth in claim 1 wherein said polarity reversing switch means includes first, second, third, and fourth switches; said first and third switches being alternately connected to said output for alternately reversing the polarity of the output voltage; said second and fourth switches being alternately connected to ground.

5. A power supply as set forth in claim 1 wherein said selection switch is used to select the number of turns on said secondary winding depending on the frequency of the input at said primary.

6. A power supply as set forth in claim 1: further including a half wave circuit connected to said transformer and said output.

7. A power supply comprising:
    an input means adapted to be connected to ground at all times during power supply operation;
    a voltage doubler, including an output capacitor, connected to said input means; and polarity reversing switch means having a first selectable condition enabling said output capacitor to be charged to one polarity and a second selectable condition enabling said output capacitor to be charged to another polarity.

8. A power supply comprising:
    a transformer having primary and secondary windings; first and second output terminals; said second output terminal being adapted to be connected to ground at all times during operating of said power supply;
    a frequency selection switch connected to said secondary winding and to said second output terminal at all times during operation of said power supply;
    polarity reversing switch means connected to said transformer secondary winding and said output terminals;
    said polarity reversing switch means including a first pair of switches and a second pair of switches connected to said output capacitor, said output capacitor being charged to one polarity when said first pair of switches is closed and to another polarity when said second pair of switches is closed.

* * * * *